(12) United States Patent
Montemurro et al.

(10) Patent No.: US 11,415,454 B2
(45) Date of Patent: Aug. 16, 2022

(54) METHOD AND SYSTEM FOR SHIPPING CONTAINER LOAD ESTIMATION

(71) Applicant: BlackBerry Limited, Waterloo (CA)

(72) Inventors: Michael Peter Montemurro, Toronto (CA); Shouxing Qu, Gloucester (CA)

(73) Assignee: BlackBerry Limited, Waterloo (CA)

( * ) Notice: Subject to any disclaimer, the term of this patent is extended or adjusted under 35 U.S.C. 154(b) by 622 days.

(21) Appl. No.: 16/423,719

(22) Filed: May 28, 2019

(65) Prior Publication Data

US 2020/0378821 A1 Dec. 3, 2020

(51) Int. Cl.
*G01G 19/08* (2006.01)
*G01G 19/12* (2006.01)
*G01G 23/01* (2006.01)

(52) U.S. Cl.
CPC ............ *G01G 19/086* (2013.01); *G01G 19/12* (2013.01); *G01G 23/01* (2013.01)

(58) Field of Classification Search
CPC ....... G01G 19/086; G01G 19/12; G01G 23/01
See application file for complete search history.

(56) References Cited

U.S. PATENT DOCUMENTS

| | | |
|---|---|---|
| 5,973,273 A | 10/1999 | Tal et al. |
| 7,472,002 B2 | 12/2008 | McCann |
| 2006/0293815 A1* | 12/2006 | McCann .......... B60G 17/01908 701/37 |
| 2011/0257900 A1* | 10/2011 | Adams .................. G01M 17/04 702/33 |
| 2016/0265960 A1* | 9/2016 | Watanabe .............. G01G 19/08 |
| 2018/0361994 A1* | 12/2018 | Seaman .................. G01S 19/14 |

FOREIGN PATENT DOCUMENTS

EP 2537007 B1 12/2012

OTHER PUBLICATIONS

PCT/CA2020/050226, International Search Report and Written Opinion, dated May 14, 2020.
PCT/CA2020/050719, International Search Report and Written Opinion, dated Aug. 20, 2020.

* cited by examiner

*Primary Examiner* — Manuel L Barbee
(74) *Attorney, Agent, or Firm* — Moffat & Co

(57) ABSTRACT

A method at a computing device, the method including obtaining sensor data for a vehicle providing one or both of displacement or acceleration information for the vehicle; calculating a vibration frequency for the vehicle; retrieving calibration data for the vehicle, the calibration data comprising at least a first known mass; a second known mass; a vibration frequency for the vehicle at the first known mass; and a vibration frequency of the vehicle at a second known mass; and using the calibration data and the vibration frequency for the vehicle, calculating a load estimation for the vehicle.

19 Claims, 9 Drawing Sheets

METHOD AND SYSTEM FOR SHIPPING CONTAINER LOAD ESTIMATION

FIELD OF THE DISCLOSURE

The present disclosure relates to the transportation of goods, and in particular relates to load estimation for vehicles or for containers on a trailer chasses.

BACKGROUND

During the transportation of goods, determining whether a trailer is loaded is an important aspect of trailer asset management. With the transportation of shipping containers using tractor trailers, it is important to understand whether a trailer, referred to herein as a chassis, is loaded or not.

The information on vehicle loading may be beneficial to the transportation company. In particular, a transportation company managing a fleet of vehicles needs to know which vehicles are loaded and which vehicles are empty. Further in some cases it would be beneficial to have an estimation of the load on a vehicle for commercial and regulatory reasons.

Typically, vehicle loading is determined by manual inspection, which is a cumbersome process that can be slow and inaccurate.

BRIEF DESCRIPTION OF THE DRAWINGS

The present disclosure will be better understood with reference to the drawings, in which.

DETAILED DESCRIPTION OF THE DRAWINGS

The present disclosure provides a method at a computing device, the method comprising: obtaining sensor data for a vehicle providing one or both of displacement or acceleration information for the vehicle; calculating a vibration frequency for the vehicle; retrieving calibration data for the vehicle, the calibration data comprising at least a first known mass; a second known mass; a vibration frequency for the vehicle at the first known mass; and a vibration frequency of the vehicle at a second known mass; and using the calibration data and the vibration frequency for the vehicle, calculating a load estimation for the vehicle.

The present disclosure further provides a computing device comprising: a processor; and a communications subsystem, wherein the computing device is configured to: obtain sensor data for a vehicle providing one or both of displacement or acceleration information for the vehicle; calculate a vibration frequency for the vehicle; retrieve calibration data for the vehicle, the calibration data comprising at least a first known mass; a second known mass; a vibration frequency for the vehicle at the first known mass; and a vibration frequency of the vehicle at a second known mass; and use the calibration data and the vibration frequency for the vehicle, calculating a load estimation for the vehicle.

The present disclosure further provides a computer readable medium for storing instruction code, which when executed by a processor of a computing device cause the computing device to: obtain sensor data for a vehicle providing one or both of displacement or acceleration information for the vehicle; calculate a vibration frequency for the vehicle; retrieve calibration data for the vehicle, the calibration data comprising at least a first known mass; a second known mass; a vibration frequency for the vehicle at the first known mass; and a vibration frequency of the vehicle at a second known mass; and use the calibration data and the vibration frequency for the vehicle, calculating a load estimation for the vehicle.

In accordance with the embodiments described below, cargo load detection systems utilizing a vertical accelerometer and/or strain gauges are described.

In the embodiments described below, the load detection is performed on a trailer chassis which is connected to a tractor. However, in other cases, the measurements may be made on other shipping containers, including, but not limited to, railcars, trucks, automobiles, among others.

Figure 1:
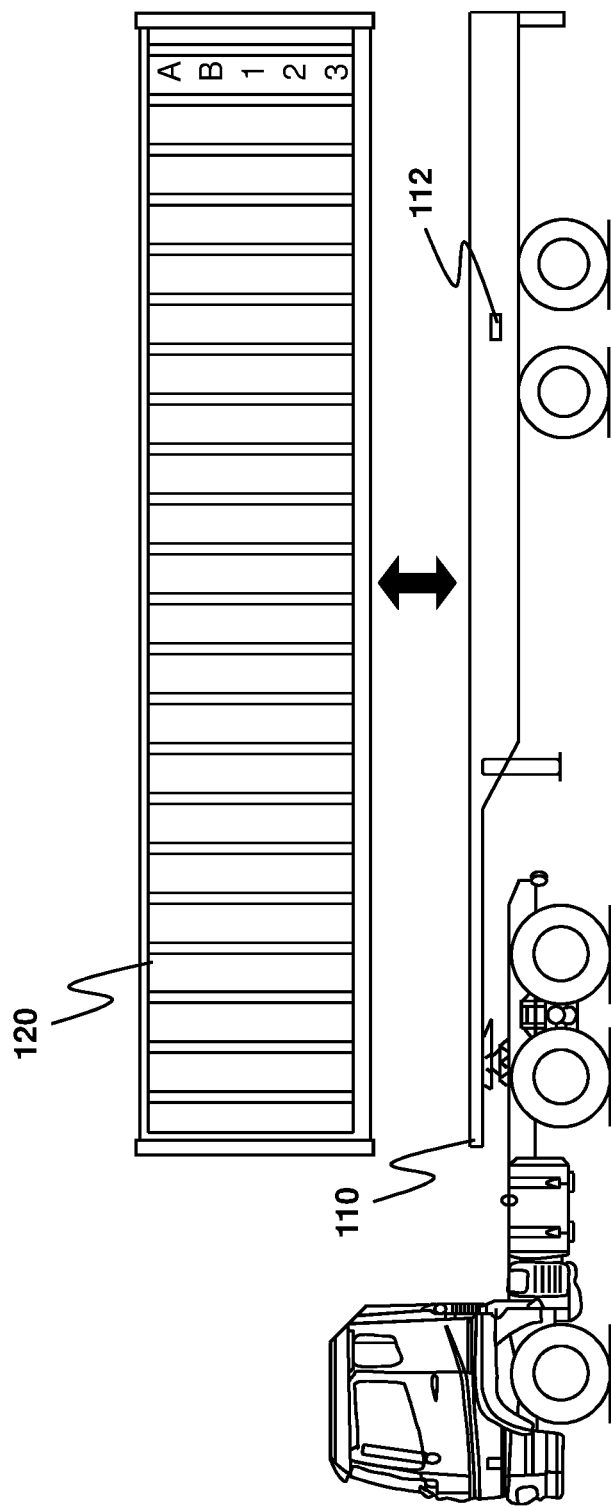
FIG. 1 is a side elevational view of a trailer chassis adapted to receive shipping containers, the figure showing an example placement of a sensor apparatus.

In order to perform load detection, a sensor apparatus may be affixed to a container, trailer, or other similar asset. Such sensor apparatus may be mounted inside of a chassis of a flatbed trailer configured to receive shipping containers. Reference is now made to FIG. 1.

In the embodiment of FIG. 1, example truck trailer 110 is shown. In one embodiment, the computing device may be mounted within the chassis of the trailer. For example, in one embodiment the computing device may be mounted above the rear wheels of the truck trailer 110. This is shown, for example, with sensor apparatus 112 in the embodiment of FIG. 1.

However, in other cases it may be beneficial to have a different position for the sensor apparatus. Further, in some embodiments it may be useful to have a plurality of such sensor apparatuses within the trailer 110.

The sensor apparatuses within trailer 110 may be used alone in some embodiments, or may be combined into sets of two or more sensor apparatuses and/or external sensors for load determination calculations.

In the embodiment of FIG. 1, trailer 110 is adapted to secure and carry a shipping container 120 thereon. Information on whether the shipping container 120 is present or not would be useful to a transportation company.

Apparatus

Figure 2:
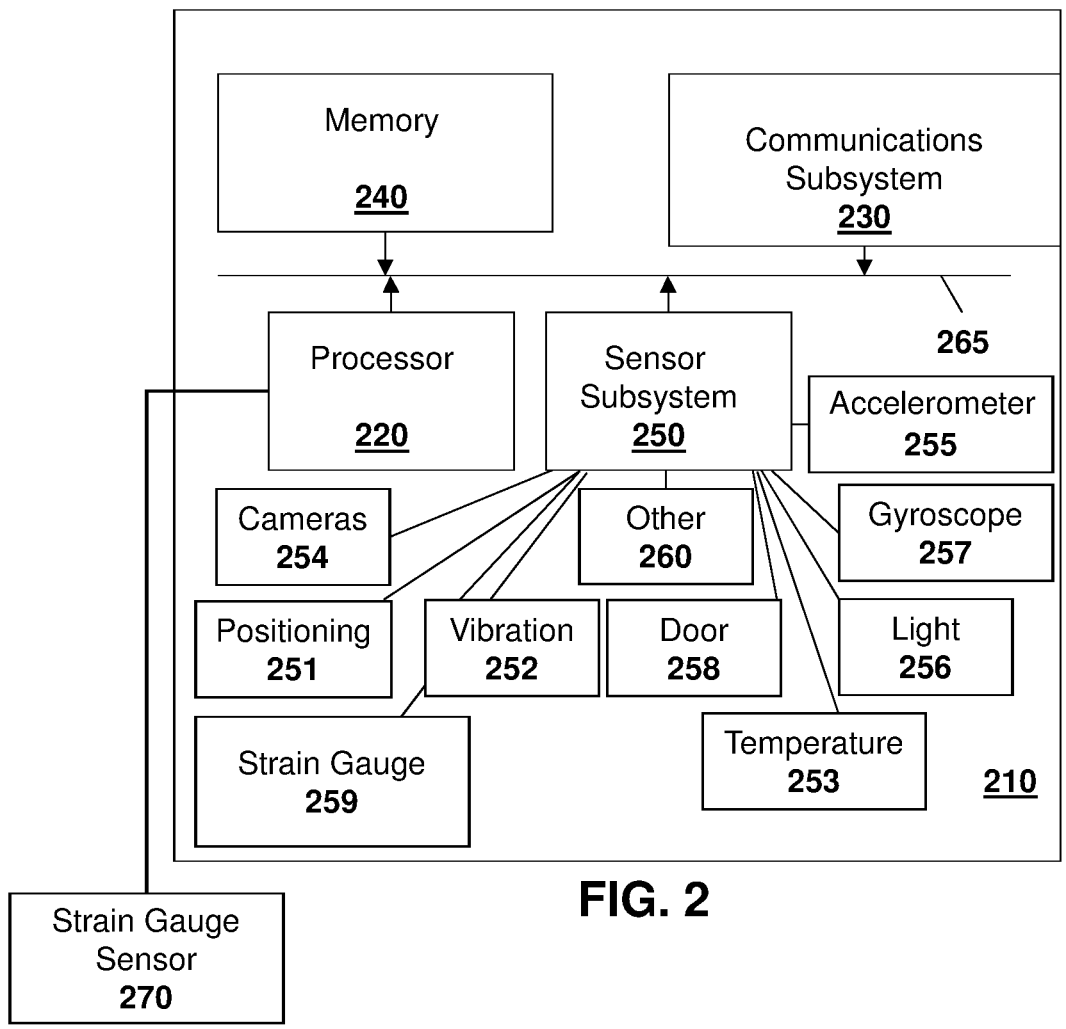
FIG. 2 is block diagram of an example sensor apparatus capable of being used between embodiments of the present disclosure.

One sensor apparatus for a vehicle, chassis, trailer, container, or other transportation asset is shown with regard to FIG. 2. The sensor apparatus of FIG. 2 is however merely an example and other sensing devices could equally be used in accordance with the embodiments of the present disclosure.

Reference is now made to FIG. 2, which shows an example sensor apparatus 210. Sensor apparatus 210 can be any computing device or network node. Such sensor apparatus or network node may include any type of electronic device, including but not limited to, mobile devices such as smartphones or cellular telephones. Examples can further include fixed or mobile devices, such as internet of things (IoT) devices, endpoints, home automation devices, medical equipment in hospital or home environments, inventory tracking devices, environmental monitoring devices, energy management devices, infrastructure management devices, vehicles or devices for vehicles, fixed electronic devices, among others.

Sensor apparatus 210 comprises a processor 220 and at least one communications subsystem 230, where the processor 220 and communications subsystem 230 cooperate to perform the methods of the embodiments described herein. Communications subsystem 230 may, in some embodiments, comprise multiple subsystems, for example for different radio technologies.

Communications subsystem 230 allows sensor apparatus 210 to communicate with other devices or network elements. Communications subsystem 230 may use one or more of a variety of communications types, including but not limited to cellular, satellite, Bluetooth™, Bluetooth™ Low Energy, Wi-Fi, wireless local area network (WLAN), sub-giga hertz radios, near field communications (NFC), IEEE 802.15, wired connections such as Ethernet or fiber, among other options.

As such, a communications subsystem 230 for wireless communications will typically have one or more receivers and transmitters, as well as associated components such as one or more antenna elements, local oscillators (LOs), and may include a processing module such as a digital signal processor (DSP) or System on Chip (SOC). As will be apparent to those skilled in the field of communications, the particular design of the communication subsystem 230 will be dependent upon the communication network or communication technology on which the sensor apparatus is intended to operate.

Processor 220 generally controls the overall operation of the sensor apparatus 210 and is configured to execute programmable logic, which may be stored, along with data, using memory 240. Memory 240 can be any tangible, non-transitory computer readable storage medium, including DRAM, Flash, optical (e.g., CD, DVD, etc.), magnetic (e.g., tape), flash drive, hard drive, or other memory known in the art.

Alternatively, or in addition to memory 240, sensor apparatus 210 may access data or programmable logic from an external storage medium (not shown), for example through communications subsystem 230.

In the embodiment of FIG. 2, sensor apparatus 210 may utilize a plurality of sensors, which may either be part of sensor apparatus 210 in some embodiments or may communicate with sensor apparatus 210 in other embodiments. For internal sensors, processor 220 may receive input from a sensor subsystem 250.

Examples of sensors in the embodiment of FIG. 2 include a positioning sensor 251, a vibration sensor 252, a temperature sensor 253, one or more image sensors/cameras 254, accelerometer 255, light sensors 256, gyroscopic sensors 257, a door sensor 258, a strain gauge 259, and other sensors 260. Other sensors may be any sensor that is capable of reading or obtaining data that may be useful for the sensor apparatus 210. However, the sensors shown in the embodiment of FIG. 2 are merely examples, and in other embodiments, different sensors or a subset of sensors shown in FIG. 2 may be used. For example, in some cases the only sensor may be an accelerometer or a strain gauge.

Further, accelerometer 255 would typically provide acceleration sensors in three dimensions. Thus, accelerometer 255 would generally include three individual accelerometers. The readings from each of the three individual accelerometers could be isolated.

Communications between the various elements of sensor apparatus 210 may be through an internal bus 265 in one embodiment. However, other forms of communication are possible.

In the embodiment of FIG. 2, rather than an internal strain gauge sensor 259, in some cases the strain guage sensor may be external to the sensor apparatus and may be controlled by sensor apparatus 210. Strain gauge sensor 270 may, for example, be mounted together with sensor apparatus 210 or may form part of sensor apparatus 210. A single or multiple strain gauge sensors can be mounted on the longitudinal frame of the chassis to detect displacement when a container is loaded on the chassis. The strain gauge sensor may, in some embodiments, consist of a microprocessor, a strain gauge, a battery, and a short-range technology radio transmitter (Bluetooth, IEEE 802.15.4, or Wi-Fi). The sensor 270 could be configured to measure vertical displacement, or both vertical and horizontal displacement relative to the chassis.

The sensor apparatus 210 may communicate with the strain gauge sensor 270 or strain gauge 259 to query the strain gauge reading under a trigger condition. Examples of trigger conditions could be: on a regular wake-up schedule negotiated between the sensor(s) and the radar unit; when the trailer is in motion; and/or when the trailer stops, among other options.

A strain gauge will typically be displaced when the container is loaded and could be calibrated to estimate the relative or absolute weight of the container.

Sensor apparatus 210 may be affixed to any fixed or portable platform. For example, sensor apparatus 210 may be affixed to shipping containers or truck trailers in one embodiment. In other embodiments, sensor apparatus 210 may be affixed to a chassis of a trailer, as for example shown in FIG. 1. In other cases, the sensor apparatus 210 may be affixed to any transportation asset for which load detection is needed, including self-propelled vehicles (e.g., automobiles, cars, trucks, buses, etc.), railed vehicles (e.g., trains and trams, etc.), and other types of vehicles including any combinations of any of the foregoing, whether currently existing or after arising, among others.

In other cases, sensor apparatus 210 may be part of a container that could be carried on or within a vehicle, for example container 120 from FIG. 1. In accordance with the present disclosure, the term container may include any sort of cargo or item transportation such as vehicles, intermodal containers, shipping bins, lock boxes, and other similar vessels.

Such a sensor apparatus 210 may be a power limited device. For example, sensor apparatus 210 could be a battery-operated device that can be affixed to a shipping container or trailer in some embodiments. Other limited power sources could include any limited power supply, such as a small generator or dynamo, a fuel cell, solar power, energy harvesting, among other options.

In other embodiments, sensor apparatus 210 may utilize external power, for example from the battery or power system of a tractor pulling the trailer, via a wiring harness connected to a 7-pin plug, from a land power source for example on a plugged-in recreational vehicle or from a building power supply, among other options. Thus, the sensor apparatus 210 may also be connected to a power cord that receives its power from a power source.

External power may further allow for recharging of batteries to allow the sensor apparatus 210 to then operate in a power limited mode again. Recharging methods may also include other power sources, such as, but not limited to, solar, electromagnetic, acoustic or vibration charging.

The sensor apparatus from FIG. 2 may be used in a variety of environments. One example environment in which the sensor apparatus may be used is shown with regard to FIG. 3.

Figure 3:
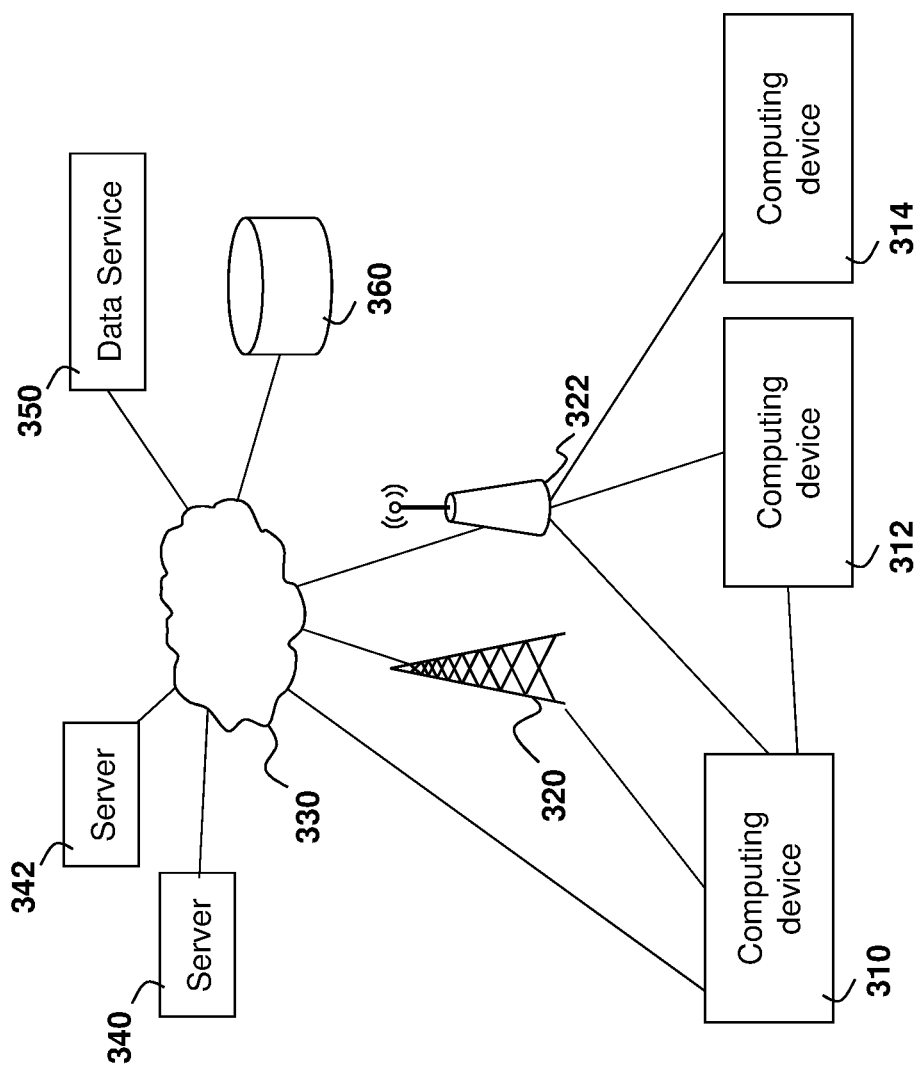
FIG. 3 is a block diagram showing an example architecture for the sensor apparatus of FIG. 2.

Referring to FIG. 3, three sensor apparatuses, namely sensor apparatus 310, sensor apparatus 312, and sensor apparatus 314 are provided.

In the example of FIG. 3, sensor apparatus 310 may communicate through a cellular base station 320 or through an access point 322. Access point 322 may be any wireless communication access point.

Further, in some embodiments, sensor apparatus 310 could communicate through a wired access point such as Ethernet or fiber, among other options.

The communication may then proceed over a wide area network such as Internet 330 and proceed to servers 340 or 342.

Similarly, sensor apparatus 312 and sensor apparatus 314 may communicate with server 340 or server 342 through one or both of the base station 320 or access point 322, among other options for such communication.

In other embodiments, any one of sensor apparatuses 310, 312 or 314 may communicate through satellite communication technology. This, for example, may be useful if the sensor apparatus is travelling to areas that are outside of cellular coverage or access point coverage.

In other embodiments, sensor apparatus 312 may be out of range of access point 322, and may communicate with sensor apparatus 310 to allow sensor apparatus 310 to act as a relay for communications.

Communication between sensor apparatus 310 and server 340 may be one directional or bidirectional. Thus, in one embodiment sensor apparatus 310 may provide information to server 340 but server 340 does not respond. In other cases, server 340 may issue commands to sensor apparatus 310 but data may be stored internally on sensor apparatus 310 until the sensor apparatus arrives at a particular location, possibly during a particular time window. In other cases, two-way communication may exist between sensor apparatus 310 and server 340.

A server, central server, processing service, endpoint, Uniform Resource Identifier (URI), Uniform Resource Locator (URL), back-end, and/or processing system may be used interchangeably in the descriptions herein. The server functionality typically represents data processing/reporting that are not closely tied to the location of sensor apparatuses 310, 312, 314, etc. For example, the server may be located essentially anywhere so long as it has network access to communicate with sensor apparatuses 310, 312, 314, etc.

Server 340 may, for example, be a fleet management centralized monitoring station. In this case, server 340 may receive information from a sensor apparatus associated with various trailers or cargo containers, providing information such as the location of such cargo containers, the temperature within such cargo containers, any unusual events including sudden decelerations, temperature warnings when the temperature is either too high or too low, cargo loading within the trailer, the mass of the trailer, among other data. The server 340 may compile such information and store it for future reference.

Other examples of functionality for server 340 are possible.

In the embodiment of FIG. 3, servers 340 and 342 may further have access to third-party information or information from other servers within the network. For example, a data services provider 350 may provide information to server 340. Similarly, a data repository or database 360 may also provide information to server 340.

For example, data services provider 350 may be a subscription-based service used by server 340 to obtain current road and weather conditions, or may be an inventory control system in some cases.

Data repository or database 360 may for example provide information such as image data associated with a particular location, aerial maps, detailed street maps, or other such information.

The types of information provided by data service provider 350 or the data repository or database 360 is not limited to the above examples and the information provided could be any data useful to server 340.

In some embodiments, information from data service provider 350 or the data repository from database 360 can be provided to one or more of sensor apparatuses 310, 312, or 314 for processing at those sensor apparatuses.

A sensor apparatus such as that described in FIGS. 2 and 3 above may be used to detect trailer loading of a container or trailer.

Calculating Trailer Loading

In accordance with some embodiments of the present disclosure, the rear segment of a transportation vehicle or trailer can be modelled as a simple spring with a mass "m" representing the mass of the container and the mass of the chassis, and a spring constant "k", where k is the stiffness of the structure and suspension. Further, a damper which may be dependent on the suspension of the chassis is represented with a damping constant "c". For example, reference is now made to FIG. 4.

Figure 4:
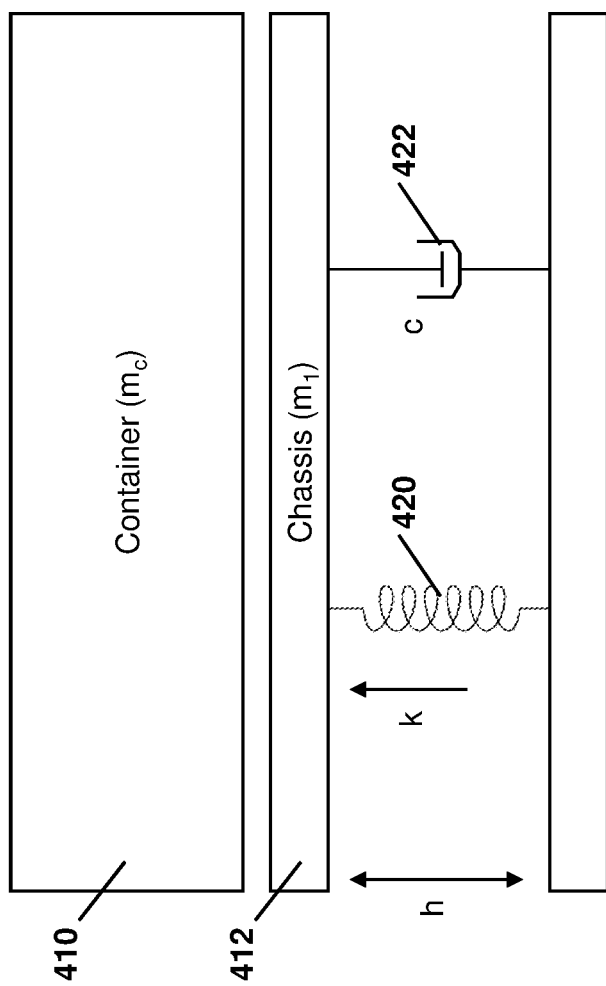
FIG. 4 is a block diagram showing a container and chassis acting on a spring and damper.

In the embodiment of FIG. 4, a container 410 has a mass "$m_c$". A chassis 412 has a mass "$m_1$". In the present disclosure, a mass "m" is the combination of masses $m_1$ and $m_c$.

A spring 420 is shown having a spring constant "k", which is representative of the stiffness of the structure and suspension.

Further, the damping constant "c" is shown using a representation 422 of the suspension.

A displacement "h" shows the amount of motion of the chassis from the rest position of the chassis towards the ground, for example when a bump is encountered by the chassis while the vehicle is operating.

The equation describing the motion of the chassis in one-dimension, using a single spring-damper, can be expressed as provided in equation 1 below:

$$m\frac{d^2h}{dt^2} = -kh - c\frac{dh}{dt} \quad (1)$$

In equation 1, m is the mass of the system, h is the displacement of the chassis from a rest position, t is time, k is the spring constant and c is the damping constant.

Solving equation 1 for the frequency of vibration yields equation 2:

$$f = \frac{1}{2\pi}\sqrt{\frac{k}{m}\left(1 - \frac{c^2}{4mk}\right)} = \frac{1}{4\pi m}\sqrt{4mk - c^2} \quad (2)$$

Based on equation 2, the frequency of vibration is inversely proportional to the mass applied to the trailer. When the trailer is under the same moving conditions, the vibration frequency of the trailer will shift lower when a shipping container is loaded on the chassis.

If a truck, trailer or other similar asset is loaded within safe operating limits, the springs on the axles should not experience any significant deformations, which may affect the frequency of vibration.

The amplitude of the oscillations depends on the forces of any impacts between the wheels in the ground, but do not affect the frequency of vibration.

Figure 5:
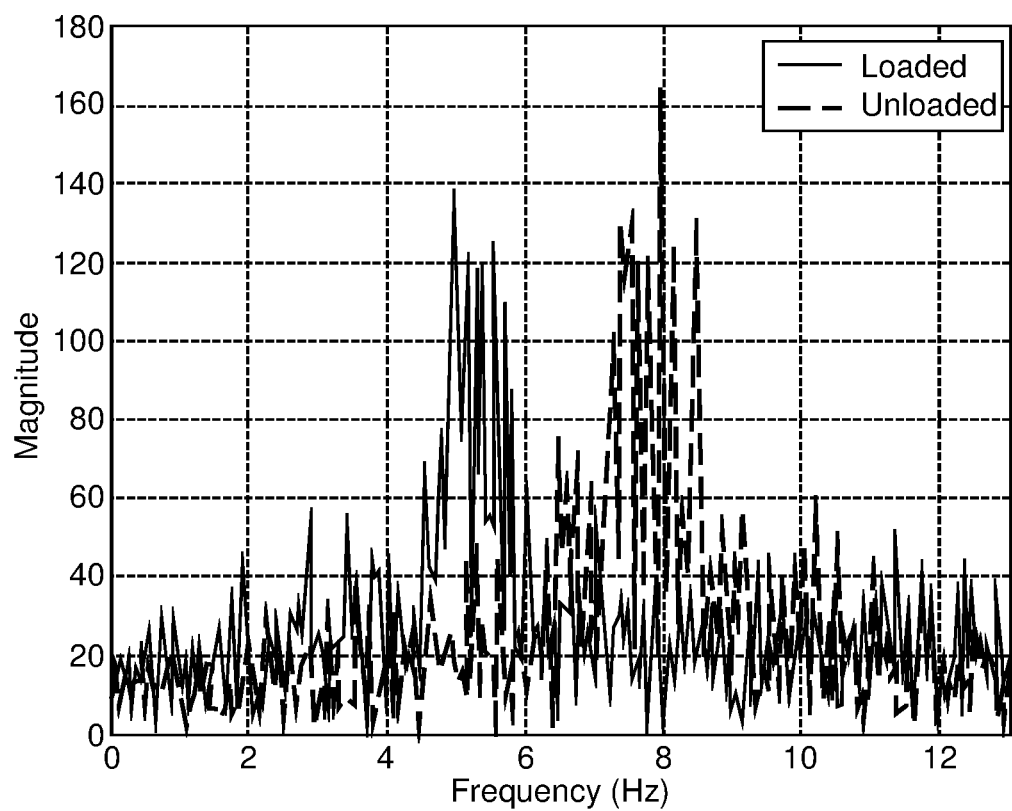
FIG. 5 is a plot showing the vibration magnitude as a function of frequency for a loaded and an unloaded chassis.

For example, reference is now made to FIG. 5, which shows an example plot of the vibration frequencies seen when a chassis is loaded or unloaded with a shipping container, respectively. As seen from FIG. 5, the frequency of the vibration shifts when the chassis is loaded.

Based on FIG. 5, by measuring the frequency of vibration as observed by an accelerometer in the vertical direction and/or by a strain gauge, a detection of whether the chassis or trailer is loaded can be made. Further, if configuration of the mass of the load with at least two differerent masses has occurred, as described below, then the frequency of vibration can be used for load estimation.

Load Estimation

Based on equation 2 above, the frequency of vibration is inversely proportional to the mass applied to a trailer. When the trailer is under the same moving conditions, the vibration frequency of the trailer will shift lower depending on the mass applied to the trailer.

At a high level, a process for detecting whether a container is loaded or unloaded involves collecting accelerometer data while the chassis is moving and detecting a frequency shift when the chassis moves between a loaded state and an unloaded state. Further, through a calibration system, a correlation between the frequency shift and a loaded mass may be made.

In particular, the unloaded vibration frequency and shift when loaded with a container may be dependent on the type of chassis, including factors such as a chassis length and the suspension type. In this regard, a calibration may be performed for the sensor apparatus to effectively be able to estimate the loaded mass at the trailer.

In some cases, each trailer will undergo a calibration phase prior to providing mass estimations. In other cases, each trailer type may undergo a calibration, for example by a manufacturer, and this data may be provided to a sensor apparatus on a particular trailer or stored at a server.

Once the calibration phase has been completed, the vibration frequency of the trailer, vehicle and or container can be input into a formula as described below in order to estimate the mass of the load.

Each of the calibration, vibration frequency detection, and mass estimation stages are described below.

Calibration

In order to enable load estimation, at least four pieces of data are needed. These are: a first weight; a vibration frequency at the first weight; a second weight; and a vibration frequency at the second weight.

For example, the first weight may be the weight of the chassis 110 from FIG. 1 without any container thereon. Such weight would be known in some cases to the manufacture of the chassis and to the owner of the chassis, and could be input into sensor apparatus 112 or stored at a server used for mass estimation.

A second weight could be the weight of unloaded chassis 110 along with an empty container 120. Again, this weight could be known from the manufacturer or owner of the chassis 110 as well as the weight of an empty container based on the container's type and size.

However, the unloaded weight and the weight with an empty container are merely examples of different masses that can be used for calibration. In other cases, partially loaded containers or containers with different masses could be loaded onto a chassis 110 and if the weight of the the combination of the load, container and chassis are known, these could also be used for the calibration.

Further, in the the examples below, the two vibration frequencies at two separate masses are used for the calibration. However, in other cases, more than two vibration frequencies at more than two different loads could be utilized to improve the accuracy of the calibration, and the embodiments of the present disclosure are not limited to only using two calibrating frequencies.

Figure 6:
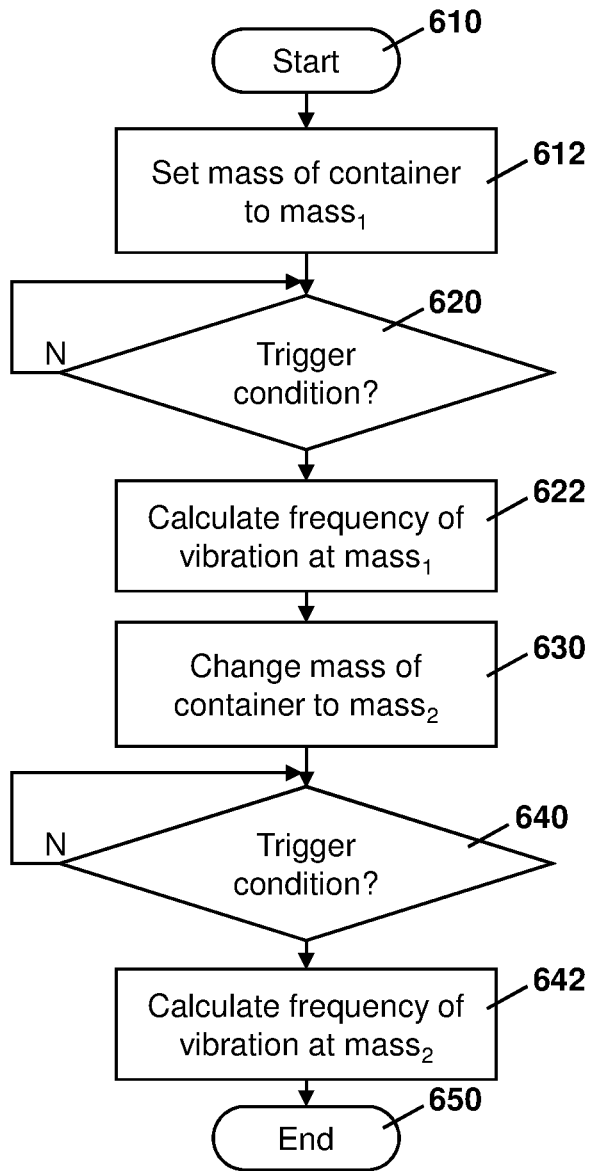
FIG. 6 is a process diagram showing a process for calibration of frequency responses associated with two known masses.

One example of a calibration phase is described with regard to FIG. 6. In the embodiment of FIG. 6, the process starts at block 610 and proceeds to block 612 in which the mass of the container is set to a first mass, which would be known. The sensor apparatus may, at block 612, be placed into a calibration mode and in some cases the first mass may be input into the sensor apparatus. In other cases, the first mass would be known at the server and would not need to be entered into the sensor apparatus.

The process next proceeds to block 620 in which a check for a trigger condition is made. For example, the trigger condition may be that the truck and trailer combination has started to move. In other cases, the trigger condition may be waiting for an accelerometer or a strain gauge to report readings over a threshold level. In other cases, the trigger may be a manual input to start reading at the sensor apparatus for a calibration mode. Other examples of trigger conditions would be apparent to those skilled in the art.

Once a trigger condition is sensed, a sequence of output data is collected from one or more sensors such as accelerometers and/or strain gauges. The frequency spectrum of this sequence of collected data then is derived by proper processing (or calculation). The vibration frequency then is obtained from the frequency spectrum.

The frequency spectrum may be calculated at block 622 through several mechanisms. Further the spectrum may be calculated over a time period which may be configured or predetermined at the sensor apparatus.

In some cases, the raw sensor data may be passed to a server for processing. In other cases, the raw sensor data may be processed at the sensor apparatus.

The unit processing the raw data would typically perform a Fourier Transform (FT) to derive the spectrum and then the primary vibration frequency. Multiple ways exist of deriving the vibration frequency, for example a frequency with the highest magnitude in the spectrum; a mean of multiple frequencies of highest magnitudes; a median of multiple frequencies of highest magnitudes; among other options.

In the embodiments herein, the means of multiple frequencies of highest magnitudes for the calibration would generally also be used for the load estimation described below.

Further, in some cases, bandpass filters may be applied to the time domain data prior to the Fourier Transform in order to minimize effects of noise.

Therefore, at block 622, the vibration frequency at a first mass is derived, either on the sensor apparatus or on the server for calculation.

The process then proceeds to block 630 in which the mass at the vehicle is changed. For example, this may involve loading an empty container onto the chassis. In other cases, it may involve adding mass to the vehicle or trailer. Other options are possible. As long as the second mass is known, it can be used for calibration.

The process then proceeds from block 630 to block 640 in which a check for a further trigger condition is made. Again the further trigger condition could be the detection of motion of the vehicle, detection of accelerometer or strain gauge readings above a threshold level, manual configuration of calibration, among other options.

From block 640, the process proceeds to block 642 in which the vibration frequency is calculated for the second mass. The calculation of the vibration frequency at block 642 is similar to the calculation of the vibration frequency at block 622, and may be done by the sensor apparatus or by the server in some cases.

From block 642, the process may then proceed to block 650 and end.

Thus, from the embodiment of FIG. 6, a calibration at two separate masses could be performed to allow for load estimation.

Further, from the embodiment of FIG. 6, the raw data can be used to adjust the length of the sampling time period for load measurement. For example, the variance measurement on the raw data over time can be used to calculate a sampling time period. Specifically, if the variance levels off after a period of time, such time interval could then be used for a load measurement.

Load Measurement

In a typical formula for vibration, the damped frequency of a vibration can be expressed as:

$$f_d = f_n \sqrt{1-\zeta^2} = \frac{1}{2\pi}\sqrt{\frac{k}{m}\left(1 - \frac{c^2}{4mk}\right)} = \frac{1}{4\pi m}\sqrt{4mk - c^2} \qquad (3)$$

In equation 3, $f_n$ is the natural frequency without damping, and is the damping ratio. In this equation, m is the mass, and c and k are two constants called the damping coefficient and the spring's Hooke constant respectively. Obviously, if c and k are known, the vibration frequency $f_d$ can be determined for a known value of m, or in reverse, the mass m can be determined for a known corresponding vibration frequency $f_d$.

The constants c and k can be obtained from two tests. If calibration such as described with regards to FIG. 6 occurred, providing two results of $f_d$, that is, $f_{d1}$ and $f_{d2}$ associated with known $m_1$ and $m_2$ respectively, then k and c can be calculated as:

$$k = \frac{4\pi^2[(m_2 f_{d2})^2 - (m_1 f_{d1})^2]}{m_2 - m_1} \qquad (4)$$

And $$c^2 = 4m_i k - (4\pi m_i f_{di})^2 \qquad (5)$$

In equation 5, i=1 or 2. Substituting equation 4 and equation 5 into equation 3 yields equation 6 below:

$$(mf_d)^2 = (m_1 f_{d1})^2 + (m - m_1)\frac{[(m_2 f_{d2})^2 - (m_1 f_{d1})^2]}{m_2 - m_1} \qquad (6)$$

In equation 6 above, $m_1, f_{d1}$ are the mass and frequency of vibration measured at a first mass, for example an empty chassis. In this case, the mass of the chassis could be taken from a data sheet and the frequency would be measured.

Further, in equation 6 above, $m_2$, $f_{d2}$ are the second mass and frequency of vibration measured at the second mass. For example, the second mass may be a chassis with an empty container. In this case, the mass of the container could be taken from a data sheet and the frequency would have to be measured. The second mass would be the sum of the empty chassis and the empty container.

Further, in equation 6, $f_d$ is the vibration frequency measured under load associated with an unknown mass.

Based on the above, equation 6 indicates that the squared product of a mass and its corresponding vibrating frequency, $(mf_d)^2$, is a linear function of mass.

Solving equation 6 for the load, m, results in equation 7:

$$(mf_d)^2 - m\frac{[(m_2 f_{d2})^2 - (m_1 f_{d1})^2]}{m_2 - m_1} = \qquad (7)$$
$$(m_1 f_{d1})^2 - m_1 \frac{[(m_2 f_{d2})^2 - (m_1 f_{d1})^2]}{m_2 - m_1}$$

Equation 7 can be expressed as a second order quadratic equation:

$$am^t + bm + p = 0 \qquad (8)$$

Where:

$$a = f_d^2 \qquad (9)$$

$$b = -\frac{[(m_2 f_{d2})^2 - (m_1 f_{d1})^2]}{m_2 - m_1} \qquad (10)$$

$$p = -(m_1 f_{d1})^2 + m_1 \frac{[(m_2 f_{d2})^2 - (m_1 f_{d1})^2]}{m_2 - m_1} \qquad (11)$$

$$p = -(m_1 f_{d1})^2 - m_1 b \qquad (12)$$

Equation 8 has a known solution of:

$$m = \frac{-b}{2a} \pm \frac{\sqrt{b^2 - 4ap}}{2a} \qquad (13)$$

Which can be expressed as:

$$m = \frac{-b}{2a}\left(1 \pm \sqrt{1 - 4ap/b^2}\right) \qquad (14)$$

If $m \geq -b/2a$, then equation 14 can be simplified to:

$$m = \frac{-b}{2a}\left(1 + \sqrt{1 - 4ap/b^2}\right) \quad (15)$$

When $4ap/b^2$ is sufficiently less than 1, equation 15 can be approximated by:

$$m \approx \frac{p}{b} - \frac{b}{a} \quad (16)$$

The values a, b and p in equation 16 can be found from equations 9, 10 and 12.

Therefore, in order to perform a mass estimation, two steps need to be performed. A first is to find the vibration frequency of the vehicle under test with the unknown mass and the second is to calculate an estimate for the vehicle loading.

Figure 7:
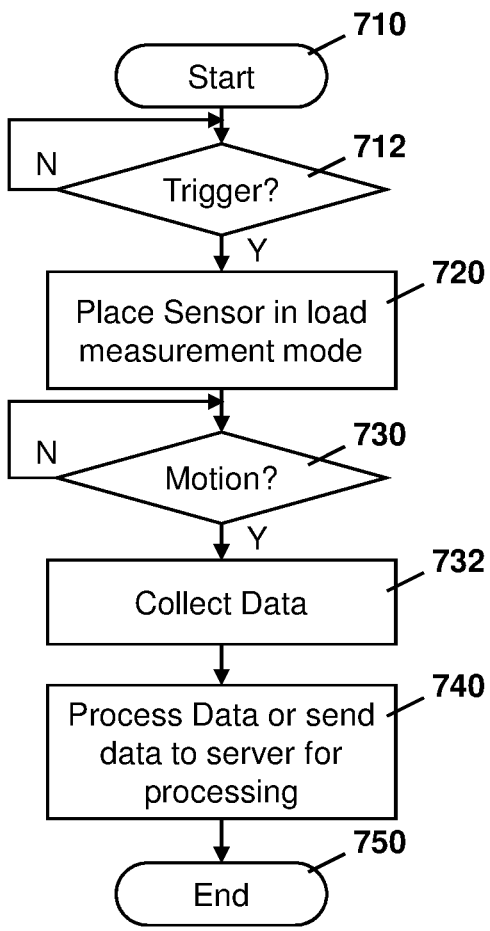
FIG. 7 is a process diagram showing the obtaining of sensor data and the processing of the data to obtain a frequency response based on an unknown mass.

Reference is now made to FIG. 7, which shows a process for finding a vibration frequency based on the unknown mass. The process of FIG. 7 starts at block 710 and proceeds to block 712 in which a check is made to determine whether a trigger condition exists for finding the vibration frequency. The trigger condition could be various events, including a manual configuration to enter the mass estimation mode, a signal from a server or from the driver, a change in state detected at the vehicle or chassis, a periodic check to determine whether the vibration frequency has changed, among other conditions.

If no trigger condition is found at block 712, the process continues to check for the trigger condition until the trigger condition is met.

Once the trigger condition is met at block 712, the process proceeds to block 720 in which the sensor apparatus places the sensor in a load measurement mode. Such load measurement mode may comprise reading sensors such as an accelerometer or strain gauge more frequently, among other options.

From block 720 the process proceeds to block 730 in which a check is made to determine whether motion is detected at the sensor apparatus. As will be apparent to those skilled in the art, the recorded sensor readings are only valuable if motion exists at the vehicle in order to obtain a vibration frequency. Therefore, if motion is not detected, the process continues to loop at block 730.

Once motion is detected, the process proceeds to block 732 in which a sequence of data is collected and recorded. Such collection of data may be from the accelerometer(s) and/or strain gauge(s) at the sensor apparatus, for example.

After a time period of collecting data, for example where the time period is established during the calibration phase or set at the sensor apparatus, the process proceeds from block 732 to block 740 in which the data may be processed. The processing of the raw data may be done either at the sensor apparatus or at a server. If the processing is done at the server, in some cases the raw data may be sent to the server for processing.

One example of the processing of data is described below with regard to FIG. 8.

After the processing at block 740 the process may proceed to block 750 and end.

The embodiment of FIG. 7 is merely one example of the detection of a frequency of vibration of a trailer or chassis and other examples of such measurement are possible. For example, in some cases the detection of motion at block 730 may be optional and the process would instead proceed directly from block 720 to block 732. In other cases, the motion detection may be part of the trigger at block 712. Other options are possible.

The processing of the data at block 740 may be done by a computing device such as the sensor apparatus or server. One option for such processing is shown with regard to FIG. 8.

Figure 8:
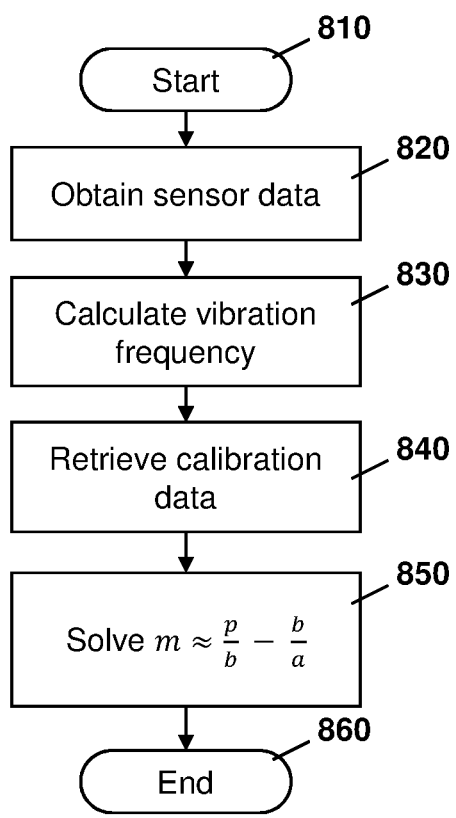
FIG. 8 is a process diagram showing the creation of a load mass estimation based on the data obtained in FIG. 7 and the calibration data of FIG. 6.

The process of FIG. 8 starts at block 810 and proceeds to block 820 in which the sensor data is obtained. The obtaining of the sensor data may be based on the embodiment of FIG. 7, and the sensed data may either be detected at the computing device or the raw data received at the computing device.

The process then proceeds to block 830 in which the vibration frequency based on the raw data is calculated. As indicated above, the vibration frequency may be derived based on a Fourier Transform of the raw data. Further, in some cases the raw data may be passed through a bandpass filter prior to the Fourier Transform to filter out noise elements. Further, the deriving of the frequency at block 830 would typically be performed in a manner similar to the deriving of the frequencies for the calibration stage.

As a result of the the calculation at block 830, $f_d$ is found.

The computing device next proceeds to block 840 in which calibration data may be retrieved. Such calibration data may be stored locally at the computing device or may be remote from the computing device and obtained from the remote storage.

Having the calibration data as well as $f_d$ allows a mass estimation to be made. Specifically, the process proceeds to block 850 in which the computing device may solve equation 16 from above.

In other cases, the calculation at block 850 may use equation 15 instead of the approximation of equation 16.

Further, at once the mass m is known, if the mass of the unloaded chassis and the mass of the empty container are known, then the mass of the load can be determined based on equation 17 below.

$$m_1 = m - m_2 \quad (17)$$

In equation 17, $m_1$ is the mass of the load, and $m_2$ is the combined mass of the empty chassis and empty container.

While the embodiments of FIGS. 6 to 8 are provided with regards to a chassis, in other cases, the embodiments of FIGS. 6 to 8 could equally be used with a closed or open trailer to determine a mass estimation for the goods loaded within such closed or open trailer.

Practical Example

The embodiments of FIGS. 6 to 8 above may be used in an example where the mass of an unloaded 40-ft chassis is $m_1 = 2,950$ kg, and the frequency $f_{d1} = 7$ Hz. When an empty container of mass $m_c = 3,750$ kg is loaded on the chassis, the frequency is shifted to $f_{d2} = 5$ Hz, with $m_2 = m_1 + m_c = 6,700$ kg.

Next, a non-empty container may be loaded on the chassis, and the frequency is shifted to 2.3 Hz.

The data above allows for the mass estimation at block 850 of FIG. 8 to be made. Specifically, the given conditions are: $m_1 = 2,950$ kg, $f_{d1} = 7$ Hz; $m_2 = m_1 + m_c = 6,700$ kg, $f_{d2} = 5$ Hz; and $f_d = 2.3$ Hz.

From equation 9 above, we get $a = f_d^2 = 5.29$.

From equation 10, we get:

$$b = -\frac{[(m_2 f_{d2})^2 - (m_1 f_{d1})^2]}{m_2 - m_1} = -185,554.$$

From equation 12, we get $p=-(m_1 f_{at})^2-m_1 b=120,961,800$.

From equation 15, we get $m \approx 34,412$ kg.

The mass of load in the non-empty container (that is, the mass of the load plus the mass of the empty container) is $m_l = m - m_1 \approx 34,412 - 2,950 \approx 31,462$ kg.

Finally, an estimate for the load would be $m_l - m_c \approx 31,462 - 3,750 \approx 27,712$ kg.

On the other hand, when the approximate equation 16 is used to replace equation 15, then we will get $m \approx 34,424$ kg, and $m_l \approx 31,474$ kg.

Finally, an estimate for the load would be $m_l - m_c \approx 31,474 - 3,750 \approx 27,724$ kg.

While the embodiment of FIG. 8 shows only one test, in other cases improvements in reliability could be achieved by performing the test a number of times. For example, if the three tests were done, averages could be taken or outliers in the data excuded.

A server such as servers 340, 342 or 350 may be any network node. For example, one simplified server that may perform the embodiments described above is provided with regards to FIG. 9.

Figure 9:
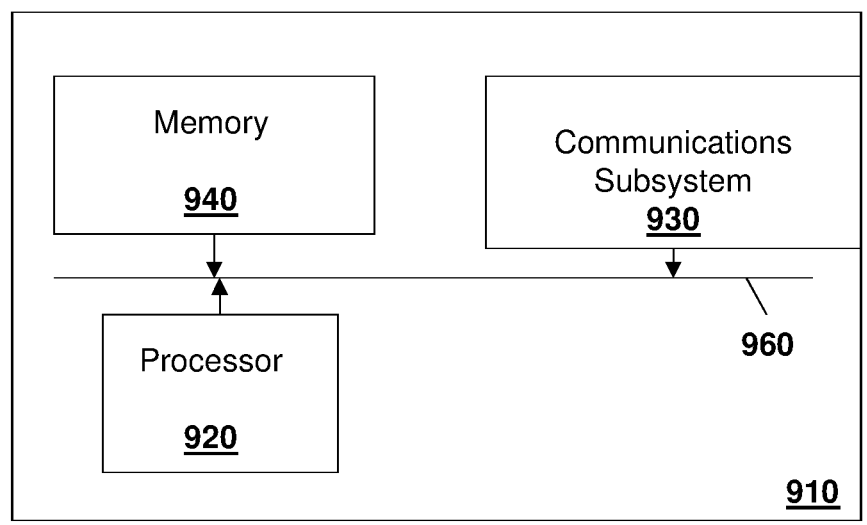
FIG. 9 is a block diagram of an example computing device or server capable of being used with the embodiments of the present disclosure.

In FIG. 9, server 910 includes a processor 920 and a communications subsystem 930, where the processor 920 and communications subsystem 930 cooperate to perform the methods of the embodiments described herein.

The processor 920 is configured to execute programmable logic, which may be stored, along with data, on the server 910, and is shown in the example of FIG. 9 as memory 940. The memory 940 can be any tangible, non-transitory computer readable storage medium, such as DRAM, Flash, optical (e.g., CD, DVD, etc.), magnetic (e.g., tape), flash drive, hard drive, or other memory known in the art. In one embodiment, processor 920 may also be implemented entirely in hardware and not require any stored program to execute logic functions.

Alternatively, or in addition to the memory 940, the server 910 may access data or programmable logic from an external storage medium, for example through the communications subsystem 930.

The communications subsystem 930 allows the server 910 to communicate with other devices or network elements.

Communications between the various elements of the server 910 may be through an internal bus 960 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a single software product or packaged into multiple software products. In some cases, functions may be performed entirely in hardware and such a solution may be the functional equivalent of a software solution.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide communication to an electronic device. For example, rather than a typical server response, the server may also provision or indicate data for a content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a computing device, the method comprising:
    obtaining sensor data for a vehicle providing one or both of displacement or acceleration information for the vehicle;
    calculating a vibration frequency for the vehicle;
    retrieving calibration data for the vehicle, the calibration data comprising at least a first known mass; a second known mass; a vibration frequency for the vehicle at the first known mass; and a vibration frequency of the vehicle at a second known mass; and
    using the calibration data and the vibration frequency for the vehicle, calculating a load estimation for the vehicle;
    wherein the first known mass is a mass of an empty chassis and the second known mass is a mass of a chassis with an empty container.

2. The method of claim 1, wherein the sensor data comprises data from at least one accelerometer associated with the vehicle, data from at least one strain gauge associated with the vehicle, or data from at least one accelerometer and from at least one strain gauge associated with the vehicle.

3. The method of claim 1, wherein the vehicle is a chassis capable of receiving containers.

4. The method of claim 1, wherein the load estimation is calculated based on:

$$m = \frac{-b}{2a}(1 + \sqrt{1 - 4ap/b^2})$$

where m is the combined mass of the vehicle and load; $a = f_d^2$, where $f_d$ is the vibration frequency of the vehicle with the unknown mass;

$$b = -\frac{[(m_2 f_{d2})^2 - (m_1 f_{d1})^2]}{m_2 - m_1},$$

where $m_1$ is the first known mass, $m_2$ is the second known mass; $f_{d1}$ is the vibration frequency at the first known mass; and $f_{d2}$ is the vibration frequency at the second known mass; and $$p = -(m_1 f_{d1})^2 - m_1 b.$$

5. The method of claim 1, wherein the load estimation is calculated based on:

$$m \approx \frac{p}{b} - \frac{b}{a}$$

where m is the combined mass of the vehicle and load; $a = f_d^2$, where $f_d$ is the vibration frequency of the vehicle with the unknown mass;

$$b = -\frac{[(m_2 f_{d2})^2 - (m_1 f_{d1})^2]}{m_2 - m_1},$$

where $m_1$ is the first known mass, $m_2$ is the second known mass; $f_{d1}$ is the vibration frequency at the first known mass; and $f_{d2}$ is the vibration frequency at the second known mass; and $$p = -(m_1 f_{d1})^2 - m_1 b.$$

6. The method of claim 1, wherein the vibration frequency for the vehicle is calculated in the same way as the vibration frequency for the vehicle at the first known mass and the vibration frequency of the vehicle at a second known mass.

7. The method of claim 6, wherein the one or both of displacement or acceleration information is passed through a bandpass filter prior to calculating the vibration frequency to remove noise.

8. The method of claim 1, wherein the obtaining the one or both of displacement or acceleration information is done by sensors at the computing device upon a trigger condition being met.

9. The method of claim 1, wherein the obtaining the one or both of displacement or acceleration information uses a communications subsystem of the computing device.

10. A computing device comprising:
    a processor; and
    a communications subsystem,
    wherein the computing device is configured to:
    obtain sensor data for a vehicle providing one or both of displacement or acceleration information for the vehicle;
    calculate a vibration frequency for the vehicle;
    retrieve calibration data for the vehicle, the calibration data comprising at least a first known mass; a second known mass; a vibration frequency for the vehicle at the first known mass; and a vibration frequency of the vehicle at a second known mass; and
    use the calibration data and the vibration frequency for the vehicle, calculating a load estimation for the vehicle;
    wherein the first known mass is a mass of an empty chassis and the second known mass is a mass of a chassis with an empty container.

11. The computing device of claim 10, wherein the sensor data comprises data from at least one accelerometer associated with the vehicle, data from at least one strain gauge associated with the vehicle, or data from at least one accelerometer and from at least one strain gauge associated with the vehicle.

12. The computing device of claim 10, wherein the vehicle is a chassis capable of receiving containers.

13. The computing device of claim 10, wherein the load estimation is calculated based on:

$$m = \frac{-b}{2a}(1 + \sqrt{1 - 4ap/b^2})$$

where m is the combined mass of the vehicle and load; $a = f_d^2$, where $f_d$ is the vibration frequency of the vehicle with the unknown mass;

$$b = -\frac{[(m_2 f_{d2})^2 - (m_1 f_{d1})^2]}{m_2 - m_1},$$

where $m_1$ is the first known mass, $m_2$ is the second known mass; $f_{d1}$ is the vibration frequency at the first known mass; and $f_{d2}$ is the vibration frequency at the second known mass; and $$p = -(m_1 f_{d1})^2 - m_1 b.$$

14. The computing device of claim 10, wherein the load estimation is calculated based on:

$$m \approx \frac{p}{b} - \frac{b}{a}$$

where m is the combined mass of the vehicle and load; $a = f_d^2$, where $f_d$ is the vibration frequency of the vehicle with the unknown mass;

$$b = -\frac{[(m_2 f_{d2})^2 - (m_1 f_{d1})^2]}{m_2 - m_1},$$

were $m_1$ is the first known mass, $m_2$ is the second known mass; $f_{d1}$ is the vibration frequency at the first known mass; and $f_{d2}$ is the vibration frequency at the second known mass; and $$p = -(m_1 f_{d1})^2 - m_1 b.$$

15. The computing device of claim 10, wherein the vibration frequency for the vehicle is calculated in the same way as the vibration frequency for the vehicle at the first known mass and the vibration frequency of the vehicle at a second known mass.

16. The computing device of claim 15, wherein the one or both of displacement or acceleration information is passed through a bandpass filter prior to calculating the vibration frequency to remove noise.

17. The computing device of claim 10, wherein the computing device is configured to obtain the one or both of displacement or acceleration information using sensors at the computing device upon a trigger condition being met.

18. The computing device of claim 10, wherein the computing device is configured to obtain the one or both of displacement or acceleration information using a communications subsystem of the computing device.

19. A non-transitory computer readable medium for storing instruction code, which when executed by a processor of a computing device cause the computing device to:
obtain sensor data for a vehicle providing one or both of displacement or acceleration information for the vehicle;
calculate a vibration frequency for the vehicle;
retrieve calibration data for the vehicle, the calibration data comprising at least a first known mass; a second known mass; a vibration frequency for the vehicle at the first known mass; and a vibration frequency of the vehicle at a second known mass; and
use the calibration data and the vibration frequency for the vehicle, calculating a load estimation for the vehicle;
wherein the first known mass is a mass of an empty chassis and the second known mass is a mass of a chassis with an empty container.

* * * * *